UNITED STATES PATENT OFFICE.

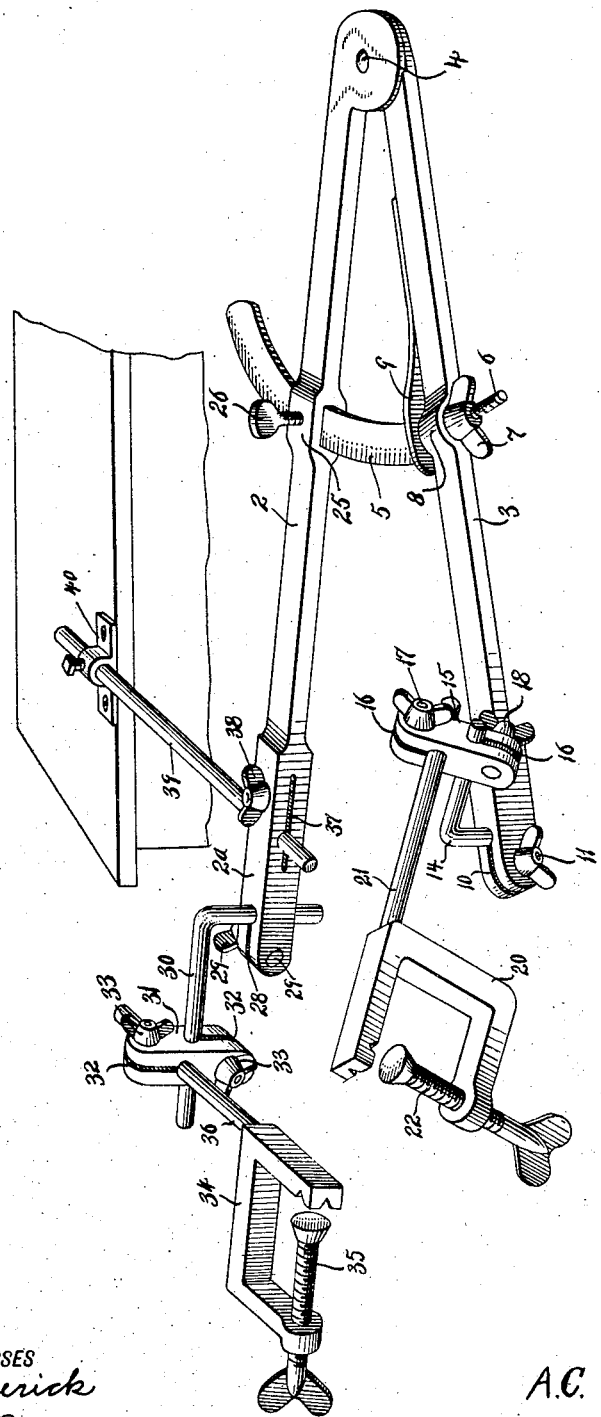

ARNOLD CHARLES TREUTHARDT, OF GEORGETOWN, TEXAS.

WORK-CLAMP.

1,323,127. Specification of Letters Patent. Patented Nov. 25, 1919.

Application filed June 5, 1919. Serial No. 301,894.

*To all whom it may concern:*

Be it known that I, ARNOLD C. TREUTHARDT, a citizen of the United States, and a resident of Georgetown, county of Williamson, and State of Texas, have invented a new and Improved Work-Clamp, of which the following is a full, clear, and exact description.

This invention relates to work clamps or clamp tongs. More particularly, the invention relates to work holding apparatus or clamp tongs used for the purpose of holding machine parts during repair.

An object of the invention is to provide work or clamp tongs fitted with an arrangement of clamping means which will be universal in its application of use. A further object of the invention is to provide work tongs or a work clamp which may be installed in some fixed position and used for the purpose of holding metal parts to be welded, brazed or otherwise repaired.

A still further object of the invention is to provide adjustable tong legs upon which are mounted universally swivelled clamps so that parts to be welded or brazed may be brought into proper relation one with the other and held during the welding or brazing process.

With the above and other objects in view the invention has relation to a certain combination and arrangement of parts, an example of which is described in the following specification, pointed out in the appended claims, and illustrated in the accompanying drawings, wherein:

The said drawings show a perspective view of a practical embodiment and example of the tongs herein disclosed.

In factories, repair plants, garages and other industrial institutions it often becomes necessary to braze or weld machine parts which have become broken or fractured. It is usually the practice to bring the parts together and prop, or otherwise mount them in correct position until the welding process has been accomplished. It is a broad purpose of this invention to provide such institutions with adequate facilities for holding machine parts together while being brazed.

Referring more in particular to the drawings, the numerals 2 and 3 point out a pair of tong legs hinged together at 4 which will permit the outer ends of the tong legs to be varied in distance apart one from the other. One of the tong legs, in this instance 3, is fitted with a radius bar 5. This radius bar is provided with a screw-threaded stem 6 upon which is mounted a wing nut 7. The stem is inserted within a bore drilled in the enlargement 8. A flat leaf pressure spring 9 is fixed to the tong leg at one end of said spring, while the other end of the spring is curved outwardly from the inner face of the tong leg so as to be slightly spaced from said leg. This spaced end of the spring 9 is provided with a bore through which the stem 6 is inserted and the radius bar is usually provided with a shoulder at the base of the stem, which shoulder abuts the spring 9. By screwing inwardly or outwardly on the nut 7 the radius bar 5 may be moved relatively to the tong leg 3. The outer end of the tong leg is provided with an enlarged end and slotted as designated at 10. At the base of slot 10 is drilled a hole into which a support bar will be inserted as later seen. The slotted end of the tong leg provides two separated clamp jaws. A hole is drilled through the clamp jaws and fitted with an adjusting clamp screw 11.

A support rod 14, comprising a cylindrical member bent approximately in the middle thereof to form a pair of right angular arms, is secured to the tong leg by inserting and clamping one arm thereof between the clamp jaws, and by tightening up on the clamp screw 11.

A clamp block 15 comprises a substantially rectangular piece of steel or other suitable metal, and slotted at each end thereof as designated by 16. These slots 16 are cut approximately right angular one with the other, and provided with a bore at the base of the slot. The clamp block is fitted with clamp screws 17 and 18 for the purpose of drawing inwardly or clamping the jaws together.

A clamp jaw comprising a U-shaped structure 20 is fitted with a clamp bar 21. The clamp bar or rod 21 is integrally made with the clamp jaw 20 by brazing, welding or otherwise securing these two parts together. The clamp jaw 20 is provided with a clamp screw 22 which has a winged head so that the clamp screw may be tightened and loosened by the operator's hands. The clamp bar 21 is confined in the bore formed in the slot 16, and the clamp block 15 is placed upon the support rod 14. The adjusting screws 11, 17 and 18 are tightened up so as to bring the clamp jaws of the several parts together in a closed relation about the members 14 and 21 so as to maintain the clamp jaw 20 in a fixed position relative with the tong leg 3.

The other tong leg 2 is provided with an enlargement 25 through which is formed a slotted opening which conforms in size to the radius bar 5. The radius bar is inserted in the slotted opening and undergoes displacement therein as the two tong legs are moved about the pivot point 4. A clamp screw 26 is screw-threaded in the tong leg and engages the radius bar 5 so as to hold the two legs in a relatively fixed position.

The outer end 2ª of this tong leg 12 is slotted at 28, and a bore is provided at the base of the slot. The slot 28 forms a pair of clamp jaws, and another bore is formed at the end of the slot or the clamp jaws to receive a clamp screw and wing nut 29. A right angular support bar 30 has one leg thereof inserted in the bore of the tong leg and upon the outer end of the member 30 is mounted a clamp block 31. This clamp block is slotted on each end thereof as designated by the numeral 32. The slots 32 are cut in each end of the clamp blocks in right angular relationship. The slots form a pair of co-acting clamp jaws, and each pair of clamp jaws is fitted with a clamping screw 33.

A clamping device, comprising a clamp jaw 34 fitted with a clamp screw 35, is adjustably mounted within the clamp 31. This is accomplished by employing a bar 36 integrally made with the clamp jaw 34, and inserted in the bore at the base of the slot. Any angular relation of the clamp jaw may be obtained by proper adjustment of the several clamp screws employed in connection with the clamp block 31 and clamp screw 29.

The enlarged or squared end 2ª is provided with a slot 37, and a bore is formed through the slot. A clamping screw 38 is inserted in a bore formed, which bore is formed through the adjacent members formed by the slot 37. This clamp screw 38 will tighten or loosen the jaws formed by the slot 37. An installation bar or shaft 39 is confined within the bore and slot 37 and the tong leg 2 is clamped upon this installation bar by proper adjustment of the clamp screw 38. The outer end of the installation member 39 is fixed to a work bench, shelf, or other substantial structure by a bracket 40. The installation member 39 may be either rotatably fixed within a suitable bracket 40 or immovably mounted thereon according to the needs and requirement of the user.

In using this work tong for holding parts to be brazed or welded, the mechanic will first adjust the apparatus upon the installation member 39 in such appropriate position as to locate the apparatus in convenient position relatively to the work bench. This will be accomplished through a clamp screw 38, and the whole apparatus can be swung about until it is located vertically or horizontally dependent upon the nature of work to be done. The two parts to be welded will be clamped in the jaws 20 and 34, and the parts brought into correct relative position. Obtaining the relative correct position for supporting the parts to be repaired may be accomplished by using any of the plurality of clamp screws. Clamp screw 26 may be loosened and the tong legs brought closer or farther apart. The adjustment provided by the several clamp blocks will allow the two parts held in the jaws to be brought together in suitable angular relationship. A minute adjustment of the parts held in the clamps may be obtained by manipulating the screw 7.

This form of work tongs is universal in application since parts can be held in any desired position.

The apparatus comprising this invention will adequately fill a place in repair plants and other institutions where welding and brazing is done.

Having thus described my invention, what I claim as new, and desire to secure by Letters Patent is:

1. Work tongs, comprising in combination; a tong leg, an installation bar adjustably fitted to the tong leg, a support bar pivotally mounted within the tong leg, a clamp block rotatably mounted on the support bar, and a clamp jaw rotatably mounted in the clamp block, another clamp leg pivotally mounted upon the first named clamp leg, a support rod pivotally mounted within this clamp leg, a clamp block pivotally mounted upon the support rod and a clamp jaw rotatably mounted in the clamp block.

2. Work tongs, comprising in combination; a tong leg, an installation bar adjustably fitted to the tong leg, a support bar pivotally mounted within the tong leg, a clamp block rotatably mounted on the support bar, and a clamp jaw rotatably mounted in the clamp block, another clamp leg pivotally mounted upon the first named clamp leg, a support rod pivotally mounted within this clamp leg, a clamp block pivotally mounted upon the support rod and a clamp jaw rotatably mounted in the clamp block, and a radius bar coöperating with the two aforesaid tong legs for the purpose of supporting the tong legs in relatively fixed position.

3. Work tongs and clamps, comprising in combination; a pair of tong legs pivoted together, a radius bar employed to fix the pivoted tong legs in spaced relation, a rod rotatably mounted in one tong leg to mount the work clamp on a work bench or other standing structure, a bent bar rotatably clamped to each tong leg, a clamped block rotatably mounted upon each bar, and a clamp carried by each clamp block.

ARNOLD CHARLES TREUTHARDT.